Patented Feb. 28, 1933

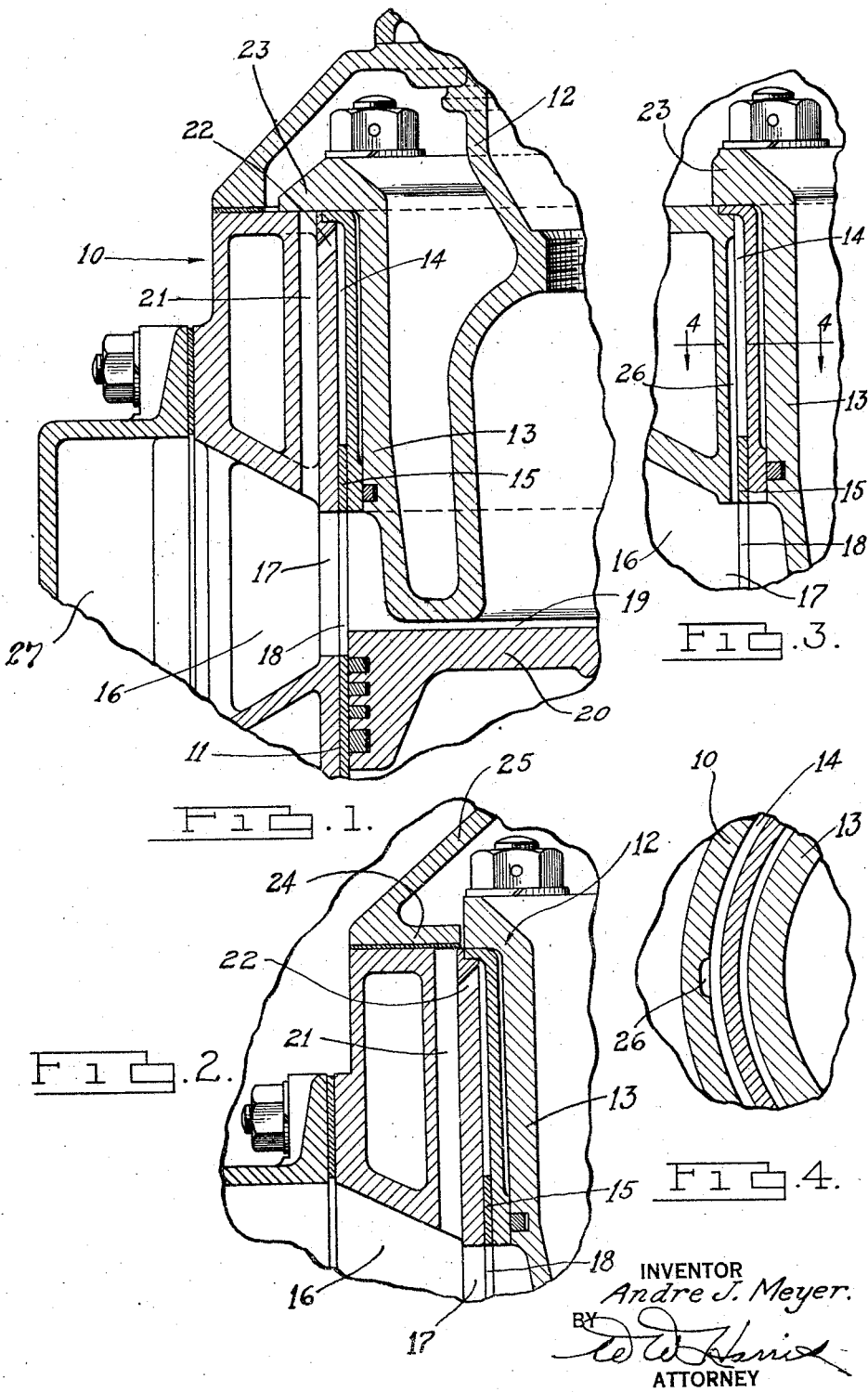

1,899,206

UNITED STATES PATENT OFFICE

ANDRE J. MEYER, OF DETROIT, MICHIGAN, ASSIGNOR TO CONTINENTAL MOTORS CORPORATION, OF DETROIT, MICHIGAN, A CORPORATION OF VIRGINIA

INTERNAL COMBUSTION ENGINE

Application filed April 11, 1930. Serial No. 443,590.

My invention relates to internal combustion engines of the sleeve valve type and more particularly to means for removing sludge from the sleeve pocket.

An object of my present invention is to facilitate the removal of sludge from the sleeve pocket of an internal combustion engine by providing means for connecting the sleeve pocket with the engine intake chamber, thereby periodically subjecting the said pocket to forces for removing the sludge therefrom.

A further object of my invention resides in the provision of a series of conduits or passages between the usual fuel mixture conducting system for the engine cylinder and the sleeve pocket preferably self contained within the engine structure whereby the sleeve valve means will exert a pumping action on the fuel mixture to circulate the same to keep the sleeve pocket washed and free of deposits. Thus the fuel mixture is circulated between the sleeve pocket and the fuel mixture conducting system carrying from the sleeve pocket any foreign particles, the latter passing to the engine combustion chamber where they are relatively harmless to the engine.

For a more detailed understanding of my invention, reference may be had to the accompanying drawing which illustrates one form which my invention may assume, and in which:

Fig. 1 is a vertical transverse sectional view of a portion of a single sleeve valve internal combustion engine constructed in accordance with my invention, Fig. 2 is a fragmentary vertical sectional view of a modified form of construction, Fig. 3 is a fragmentary vertical sectional view of a still further modified form of construction, and Fig. 4 is a detail sectional view taken on the line 4—4 of Fig. 3.

In the accompanying drawing, I have shown my invention incorporated with the Burt-McCollum type of sleeve valve engine, in which an engine cylinder block 10 is provided with one or more cylinders 11. The cylinder is closed by a cylinder head 12 having a portion 13 depending within and spaced from the cylinder walls to form an annular sleeve pocket 14 for accommodating the upper end of a sleeve valve 15, said sleeve valve being actuated by any suitable mechanism (not shown) with a combined reciprocating and oscillating movement, whereby any point on the sleeve traces a closed curved path with respect to the cylinder walls. The sleeve valve is driven at half engine speed for the usual four stroke cycle engine.

The cylinder block is provided with the usual intake chamber or passage 16 and intake port 17, the sleeve valve being provided with a port 18 cooperating with the cylinder port to place the engine combustion chamber 19 in communication with the cylinder intake chamber on the suction stroke of the piston 20. It will be understood that the intake chamber 16 is supplied with the usual fuel mixture from the usual carburetor (not shown) by way of a suitable fuel mixture conducting means or intake manifold 27.

Difficulty has been experienced with sleeve valve engines by the accumulation of deposits in the vicinity of the sleeve pocket, these deposits are commonly termed "sludge" and are formed by carbon, water and other residual materials which find their way to the sleeve pocket in the normal operation of the engine. This sludge accumulation rusts the engine parts, decreases the heat transfer qualities of the cylinder head, prevents the smooth operation of the sleeve valve, and in general is detrimental to the efficient operation of the engine.

Experience has shown that better results are obtained in removing the sludge, when the sleeve pocket is periodically subjected to forces that tend to suck out the sludge. In order to accomplish this I have provided a conduit means for connecting the sleeve pocket with the cylinder intake chamber or passage adjacent to the cylinder intake port. The intake chamber is of course filled with fuel vapor under more or less vacuum pressure at all times, but during the period when the intake port is open, there is more or less of a surge of fuel into the combustion chamber causing an increase in the vacuum pressures in the chamber as well as inducing a suction effect in the conduit by auto-extraction. The conduit means comprises a passage or hole 21 preferably drilled vertically in the engine cylinder block, said passage or hole opening through the top face of the cylinder block. A lateral passage or hole 22 is provided for connecting the passage 21 with the sleeve pocket, said passage 22 preferably opening into the sleeve pocket adjacent the upper portion thereof.

As shown in Fig. 1 the upper open end of the passage 21 is closed by the flange 23 of the cylinder head which overlies the opening. In Figure 2 I have shown a lateral flange 24 carried by the cover 25, which is extended inwardly so as to overlie the open end of the passage 21.

Figures 3 and 4 show a further modified construction in which the conduit means is formed by providing a groove 26 in the side of the cylinder wall, the groove opening into the cylinder intake chamber, but preferably stopping short of the top of the cylinder wall, though obviously the groove could extend all the way to the top where it would be closed by the cylinder head flange. The groove 26 or hole 21 could be either cast or machined in the cylinder block.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an engine of the sleeve valve type, a cylinder block having an intake chamber, a cylinder and an intake port intermediate the cylinder and intake chamber, sleeve valve means associated with the cylinder, a sleeve pocket structure accommodating the sleeve valve means, and conduit means communicating at one end with the sleeve pocket and at the other end with the cylinder intake chamber, said sleeve pocket being otherwise closed.

2. In an engine of the sleeve valve type, a cylinder block having an intake chamber, a cylinder and an intake port intermediate the cylinder and intake chamber, sleeve valve means associated with the cylinder, a sleeve pocket structure accommodating the sleeve valve means, and conduit means connecting the outer end of the sleeve pocket with the cylinder intake chamber, said sleeve pocket being otherwise closed.

3. In an engine of the sleeve valve type, a cylinder block having an intake chamber, a cylinder and an intake port intermediate the cylinder and intake chamber, sleeve valve means associated with the cylinder, a sleeve pocket structure accommodating the sleeve valve means, and conduit means connecting the extreme upper portion of said sleeve pocket with the cylinder intake chamber, said sleeve pocket being otherwise closed.

4. In an engine of the sleeve valve type, a cylinder block having an intake chamber, a cylinder and an intake port intermediate the cylinder and intake chamber, sleeve valve means associated with the cylinder, a sleeve pocket structure accommodating the sleeve valve means, said cylinder structure provided with a passage communicating at one end with the sleeve pocket and at the other end with the cylinder intake chamber, said sleeve pocket being otherwise closed.

5. In an engine of the sleeve valve type, a cylinder block having an intake chamber, a cylinder and an intake port intermediate the cylinder and intake chamber, sleeve valve means associated with the cylinder, a sleeve pocket structure accommodating the sleeve valve means, said cylinder structure provided with a passage communicating at one end with the sleeve pocket and at the other end with the cylinder intake chamber closely adjacent to the intake port, said sleeve pocket being otherwise closed.

6. In an engine of the sleeve valve type, a cylinder block having an intake chamber, a cylinder and an intake port intermediate the cylinder and intake chamber, a sleeve valve associated with the cylinder, a cylinder head means closing the cylinder end and having a portion depending within the cylinder to provide a pocket accommodating the upper end of the sleeve valve, said cylinder block provided with a passage communicating at one end with the cylinder intake chamber and extended upwardly through the top face of the cylinder block, said passage communicating with the sleeve pocket, and means engaging the top face of said cylinder block and arranged to overlie the open end of said passage.

7. In an engine of the sleeve valve type, a cylinder block having an intake chamber, a cylinder and an intake port intermediate the cylinder and intake chamber, a sleeve valve associated with the cylinder, a cylinder head means closing the cylinder end and having a portion depending within the cylinder to provide a pocket accommodating the upper end of the sleeve valve, said cylinder block provided with a passage communicating at one end with the cylinder intake chamber and extended upwardly through the top face of the cylinder block, said passage communicating with the sleeve pocket, and means carried by said cylinder head for engaging the top face of said cylinder block and arranged to overlie the open end of said passage.

8. In an engine of the sleeve valve type, a cylinder block having an intake chamber, a cylinder and an intake port intermediate the cylinder and intake chamber, a sleeve valve associated with the cylinder, a cylinder head means closing the cylinder end and having a portion depending within the cylinder to provide a pocket accommodating the upper end of the sleeve valve, said cylinder block provided with a passage communicating at one end with the cylinder intake chamber and extended upwardly through the top face of the cylinder block, said passage communicating with the sleeve pocket, and a flange carried by said cylinder head for engaging the top face of said cylinder block and arranged to overlie the open end of said passage.

9. In an engine of the sleeve valve type, a cylinder block having an intake chamber, a cylinder and an intake port intermediate the cylinder and intake chamber, sleeve valve means associated with the cylinder, a sleeve pocket structure accommodating the sleeve valve means, the cylinder wall provided with a groove extending longitudinally of the cylinder, said groove communicating at one end with the sleeve pocket and at the other end with the cylinder intake chamber.

10. In an engine of the sleeve valve type, a cylinder block having an intake chamber, a cylinder and an intake port intermediate the cylinder and intake chamber, sleeve valve means associated with the cylinder, a sleeve pocket structure accommodating the sleeve valve means, said cylinder wall provided with a groove opening inwardly to the sleeve pocket and communicating with the cylinder intake chamber.

11. In an engine of the sleeve valve type, a cylinder block structure having a cylinder contained therein, a cylinder head structure closing one end of the cylinder, sleeve valve means operably associated with the cylinder, said structures cooperating to provide a pocket for receiving the sleeve valve means, fuel mixture conducting means for the cylinder, passage means intermediate the fuel mixture conducting means and the sleeve pocket whereby fuel mixture will be circulated between the fuel mixture conducting means and the sleeve pocket to carry deposits from the sleeve pocket.

12. In an engine of the sleeve valve type, a cylinder block structure having a cylinder contained therein, a cylinder head structure closing one end of the cylinder, sleeve valve means operably associated with the cylinder, said structure cooperating to provide a pocket for receiving the sleeve valve means, fuel mixture conducting means for the cylinder, passage means intermediate the fuel mixture conducting means and the sleeve pocket whereby fuel mixture will be circulated between the fuel mixture conducting means and the sleeve pocket to carry deposits from the sleeve pocket, the movement of the sleeve valve means being adapted to cause said circulation.

13. In an engine of the sleeve valve type, a cylinder block having a cylinder, fuel mixture conducting means for the cylinder, a sleeve pocket structure, sleeve valve means operable within said pocket, passage means intermediate the fuel mixture conducting means and the pocket whereby fuel mixture will be circulated between the fuel mixture conducting means and the sleeve pocket.

14. In an engine of the sleeve valve type, a cylinder block having a cylinder, fuel mixture conducting means for the cylinder, a sleeve pocket structure, sleeve valve means operable within said pocket, passage means intermediate the fuel mixture conducting means and the pocket whereby fuel mixture will be circulated between the fuel mixture conducting means and the sleeve pocket, the movement of the sleeve valve means adapted to cause said circulation.

15. In an engine of the sleeve valve type, a cylinder block structure having a cylinder contained therein, a cylinder head structure closing one end of the cylinder, sleeve valve means operably associated with the cylinder, said structure cooperating to provide a pocket for receiving the sleeve valve means, said cylinder block structure provided with a passage opening at one end thereof in the upper face of the cylinder block structure, said cylinder head structure provided with a flange cooperatively associated with said passage opening, and fuel mixture conducting means for the cylinder, said passage opening at the other end thereof into said fuel mixture conducting means.

16. In an engine of the sleeve valve type, a cylinder block structure having a cylinder contained therein, a cylinder head structure closing one end of the cylinder, sleeve valve means operably associated with the cylinder, said structures cooperating to provide a pocket for receiving the sleeve valve means, one of said structures having a deposit conducting passage, said cylinder head structure provided with a portion thereof cooperating with said passage.

17. In an engine of the sleeve valve type, a cylinder block structure having a cylinder contained therein, a cylinder head structure closing one end of the cylinder, sleeve valve means operably associated with the cylinder, said structures cooperating to provide a pocket for receiving the sleeve valve means, one of said structures having a deposit conducting passage, said cylinder head structure provided with a flange seated on the cylinder block structure, said flange having a portion thereof cooperating with one end of said passage.

18. In an engine of the sleeve valve type, a cylinder block structure having a cylinder contained therein, a cylinder head structure closing one end of the cylinder, sleeve valve means operably associated with the cylinder, said structures cooperating to provide a pocket for receiving the sleeve valve means, said cylinder block structure provided with a passage opening at one end thereof in the upper face of the cylinder block structure, said cylinder head structure provided with a flange overlying said passage.

19. In an engine of the sleeve valve type, a cylinder block structure having a cylinder, fuel mixture conducting means for the cylinder, a sleeve pocket structure, sleeve valve means operable in said pocket, said cylinder block structure having a passage extending from said fuel mixture conducting means and a second passage branched from said first passage for communication with said pocket.

20. In an engine of the sleeve valve type, a cylinder block structure having a cylinder, fuel mixture conducting means for the cylinder, a sleeve pocket structure, sleeve valve means operable in said pocket, said cylinder block structure having a passage extending from said fuel mixture conducting means and a second passage branched from said first passage for communication with said pocket, and a cylinder head structure having a portion thereof overlying said first passage.

21. In an engine of the sleeve valve type, a cylinder block structure having a cylinder, fuel mixture conducting means for the cylinder, a sleeve pocket structure, sleeve valve means operable in said pocket, said cylinder block structure having a passage extending from said fuel mixture conducting means and a second passage branched from said first passage for communication with said pocket, and a cylinder head structure having a portion thereof overlying said first passage, said first passage extending outwardly to the outer face of the cylinder block structure.

22. In an engine of the sleeve valve type, a cylinder block structure having a cylinder, fuel mixture conducting means for the cylinder, a sleeve pocket structure, sleeve valve means operable in said pocket, said cylinder block structure having a passage extending from said fuel mixture conducting means and a second passage branched from said first passage for communication with said pocket, said second passage communicating with the outer end of said pocket.

23. In an engine of the sleeve valve type, a cylinder block structure having a cylinder, fuel mixture conducting means for the cylinder, a sleeve pocket structure, sleeve valve means operable in said pocket, said cylinder block structure having a passage extending outwardly from said fuel mixture conducting means and laterally for communication with said pocket.

24. In an engine of the sleeve valve type, a cylinder block structure having a cylinder, fuel mixture conducting means for the cylinder, a sleeve pocket structure, sleeve valve means operable in said pocket, said cylinder block structure having a passage extending outwardly from said fuel mixture conducting means and laterally for communication with said pocket at the outer end of said pocket.

In testimony whereof I affix my signature.
ANDRE J. MEYER.